(12) United States Patent
Rouyre

(10) Patent No.: US 7,407,135 B2
(45) Date of Patent: Aug. 5, 2008

(54) AIRCRAFT PROVIDED WITH A BELLY FAIRING, AND CORRESPONDING BELLY FAIRING

(75) Inventor: François Rouyre, Cornebarrieu (FR)

(73) Assignee: Airbus France, Toulouse (FR)

( * ) Notice: Subject to any disclaimer, the term of this patent is extended or adjusted under 35 U.S.C. 154(b) by 449 days.

(21) Appl. No.: 11/147,861

(22) Filed: Jun. 8, 2005

(65) Prior Publication Data

US 2006/0065784 A1 Mar. 30, 2006

(30) Foreign Application Priority Data

Jun. 11, 2004 (FR) .................................. 04 51159

(51) Int. Cl.
*B64C 7/00* (2006.01)
(52) U.S. Cl. ....................... 244/119; 244/130
(58) Field of Classification Search ............. 244/117 R, 244/119, 120, 129.4, 131, 129.1, 130
See application file for complete search history.

(56) References Cited

U.S. PATENT DOCUMENTS

| 3,417,509 | A | * | 12/1968 | Sherron | ........................ 49/130 |
| 5,071,092 | A | * | 12/1991 | Williams et al. | .......... 244/129.1 |
| 5,542,626 | A | * | 8/1996 | Beuck et al. | ................ 244/107 |
| 6,105,902 | A | * | 8/2000 | Pettit | ........................... 244/119 |
| 6,340,135 | B1 | | 1/2002 | Barton | |
| 6,581,877 | B2 | * | 6/2003 | Pauly | ........................ 244/131 |
| 6,655,635 | B2 | * | 12/2003 | Maury et al. | ................. 244/131 |
| 2003/0163985 | A1 | | 9/2003 | Stretton | |

FOREIGN PATENT DOCUMENTS

EP 0 947 421 A1 10/1999
FR 2 836 890 A 9/2003

* cited by examiner

*Primary Examiner*—Rob Swiatek
(74) *Attorney, Agent, or Firm*—Patterson, Thuente, Skaar & Christensen, P.A.

(57) ABSTRACT

In an aircraft comprising a fuselage and a belly fairing, the fairing is made of two independent parts. For example, a first part of the fairing comprises a front section, a central section and a first portion of a rear section. A second part of the fairing comprises a second portion of the rear section. The second part can shift relative to the first part of the fairing. Also disclosed is a belly fairing for aircraft comprising two independent parts.

10 Claims, 5 Drawing Sheets

AIRCRAFT PROVIDED WITH A BELLY FAIRING, AND CORRESPONDING BELLY FAIRING

RELATED APPLICATION

This application claims priority to French Application No. 04 51159 filed Jun. 11, 2004.

BACKGROUND OF THE INVENTION

1. Field of the Invention

An object of the invention is an aircraft provided with a ventral fairing or belly fairing. More specifically, an object of the invention is an aircraft whose belly fairing has great length. The fairing of the aircraft of the invention is formed by two independent parts. The invention can be applied in aeronautics.

It is an aim of the invention to provide a fairing capable of absorbing compression and bending forces caused by the movements of the aircraft and transmitted to the fairing, whatever the size of said fairing. More specifically, the aim of the invention therefore is to reduce the frontal loads absorbed by the fairing. It is an additional aim of the invention to diminish the total weight of an aircraft provided with a fairing.

2. Description of the Prior Art

In aeronautics, aircraft provided with a belly fairing, are known. The fairing is fixed on a lower part of the fuselage of the aircraft at the intersection of the fuselage with the wing structure. The belly fairing plugs the lower part of the fuselage. The belly fairing, which is cradle-shaped, is provided with a base and two sides, or longitudinal panels, rising laterally on either side of the fuselage. Each panel is provided with a recess capable of letting through a wing of the aircraft wing structure.

At present, the fairing is fixed to the lower part of the fuselage, on an entire periphery of said fairing. It also possible to add localized fastening devices (or fixing mechanisms) such as those described in the patent FR 2 836 890, to optimize the holding of the fairing to the fuselage. Thus, for example, an aircraft with a fairing of about 20 meters may be provided with about ten of these localized fastening devices, evenly distributed throughout a surface of the fairing. Each localized fastening device connects the fairing to an internal structure of the fuselage.

Such an approach gives good results for holding the fairing to the fuselage in small or medium-sized aircraft. A small or medium-sized aircraft is understood to mean an aircraft whose belly fairing has a length not exceeding 25 meters, i.e. 25 meters taken from the front to the rear of the aircraft, the front and rear of the aircraft being defined relative to the direction of progress of the aircraft. Indeed, in the case of such an aircraft, the dimensions of the fairing are such that said fairing is capable of absorbing the compression and bending forces to which it is subjected during movement of the aircraft.

However, there is a growing trend towards increasing the size of aircraft, especially in order to increase the quantity of load during each transport operation. The size of the associated fairing may attain sizes of more than about 30 meters. Owing to the length, certain zones of such a fairing may be subjected to major compression forces linked to the bending of the fuselage. It is difficult for these forces to be absorbed by the fairing.

To resolve this problem, a large number of localized fastening devices may be used to ensure that the fairing is properly held to the fuselage throughout the length of said fairing. However, increasing the number of localized fastening devices considerably augments the total mass of the aircraft.

The invention seeks to resolve the problems stated here above by proposing a two-part fairing. The two parts are independent of each other from a structural point of view but ensure continuity of aerodynamic shape. Each part is fixedly joined to the fuselage of the aircraft by means of a fastening of a periphery of each part to internal structures of the fairing. Advantageously, a rear end of the fairing is independent of the rest of said fairing. Indeed, a rear part of the fairing comprising the rear end is, by its size, the part of the fairing most subjected to compression and bending forces. Separating the rear part reduces the transmission of the frontal load along said rear part, from a front end to the rear end of the fairing. The number of localized fastening devices needed to hold the fairing to the fuselage is furthermore reduced, since the fairing is less subjected to forces tending to tear it away from the fairing.

SUMMARY OF THE INVENTION

An object of the invention therefore is an aircraft comprising:
  a fuselage,
  a wing structure provided with at least two wings placed on either side of the fuselage,
  a belly fairing, a periphery of said fairing being fixedly joined to said fuselage,
  wherein the fairing is made of two structurally independent parts.

According to exemplary embodiments of the invention, the aircraft may also comprise all or part of the following characteristics:
  a first part of the fairing has a front section, a central section and a first portion of a rear section, a second part of the fairing comprising a second portion of the rear section,
  the first part of the fairing is provided with four devices for the localized fastening of said first part to internal structures of the fuselage;
  the second part of the fairing can shift relative to the first part of said fairing; the aircraft has a compressible seal positioned between the two parts of the fairing;
  the aircraft has two panels, respectively joined fixedly to the first portion of the rear section of the belly fairing and joined fixedly to the second portion of the rear section of the belly fairing, the panels at least partially overlapping one another and being capable of sliding relative to one another;
  the aircraft has an intermediate layer positioned between the two panels, the layer being capable of reducing friction between the two panels;
  the intermediate layer is made of plastic with a low friction coefficient; the aircraft has at least one peripheral junction device capable of connecting a periphery of the two parts of the belly fairing to the fuselage;
  the fairing is fixedly joined to a lower part of the fuselage;
  the fairing is fixedly joined to an upper part of the fuselage.

An object of the invention is also a belly fairing for aircraft, a periphery of the fairing being designed to be fixedly joined to a fuselage of the aircraft, wherein the belly faring comprises two independent parts, one first part of the fairing being formed by a front section, a central section and a first portion of a rear section of said fairing, and a second part being formed by a second portion of said rear section.

BRIEF DESCRIPTION OF THE DRAWINGS

The invention will be understood more clearly from the following description and from the accompanying figures. These figures are given purely by way of an indication and in no way restrict the scope of the invention. Of these figures.

MORE DETAILED DESCRIPTION

Figure 1:
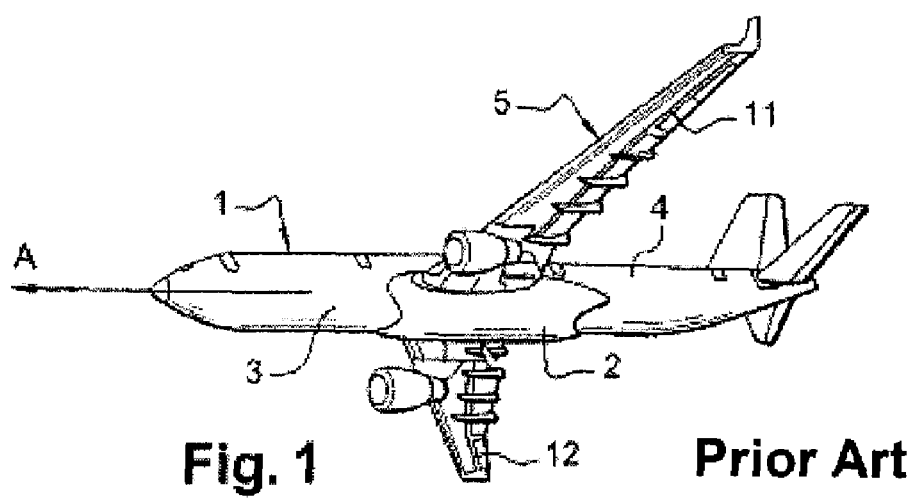
FIG. 1 is a bottom view of an aircraft provided with a prior art fairing.

FIG. 1 shows an aircraft 1 provided with a belly fairing 2 such as is known in the prior art. The fairing 2 is a single-piece structure. The fairing 2 is fixedly joined to a bottom part 3 of the fuselage 4 of the aircraft 1, at the intersection of the fuselage 4 with the wing structure 5 of the aircraft 1.

Figure 2:
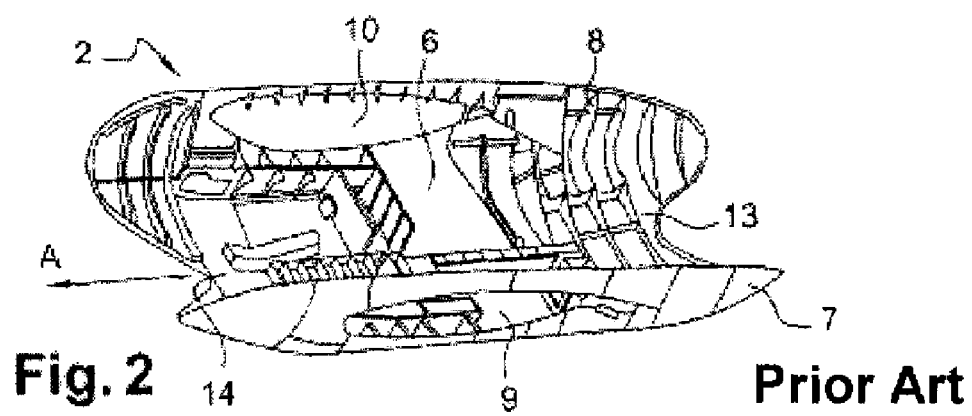
FIG. 2 is a top view of a prior art fairing.

FIG. 2 shows a more detailed view of the prior art fairing 2. The fairing 2 has the general shape of a cradle. The belly fairing 2 is provided with a base 6 and two sides 7 and 8, or longitudinal panels, rising laterally on either side of the fuselage 4 (FIG. 1). Each panel 7 and 8 is provided with a recess, respectively 9 or 10, capable of letting through a wing 11 or 12 of the wing structure 5 of the aircraft 1.

A fairing 2 of this kind is subjected to compression and bending forces due especially to a progress A of the aircraft 1. Indeed, the belly fairing 2 is prominent relative to the lower part 3 of the aircraft 1 and therefore offers a surface on which the tearing, compression and bending forces can be exerted.

If the fairing 2 is large-sized, i.e., if its length exceeds 20 meters, said fairing 2 may tend to bend under the action of the forces.

Figure 3:
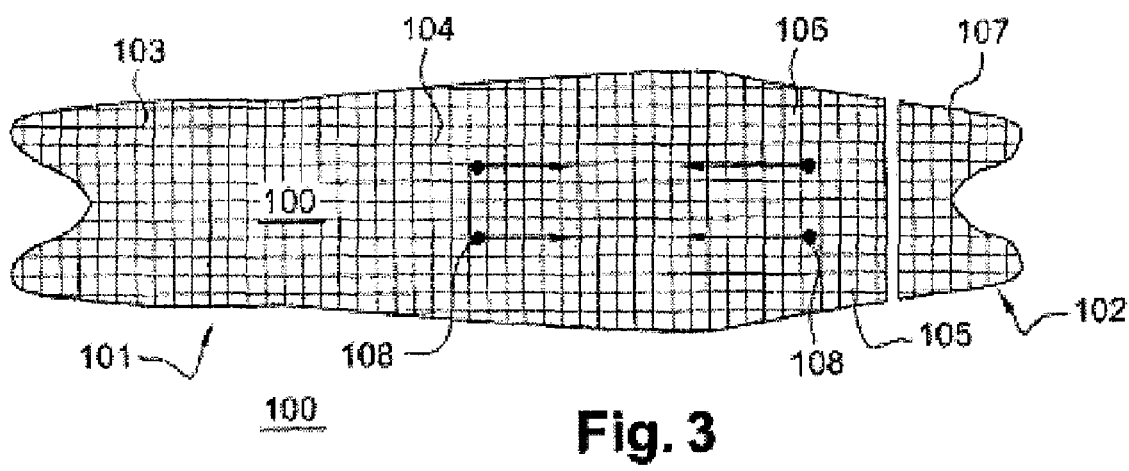
FIG. 3 is a diagrammatic view of a fairing according to an exemplary embodiment of the invention.

The inventors have observed that, in such a case, a rear end 13 of the fairing 2 is more capable of bending, owing to the distribution of the forces, than a front end 14 of said fairing 2. Thus, as can be seen in FIG. 3, the invention proposes a fairing 100 made of two independent parts 101 and 102. A general cradle shape of the fairing 100 is maintained. Advantageously, the first part 101 has a front section 103, a central section 104 and a front portion 106, or first portion, of a rear section 105 while the second part 102 has a rear portion 107, or second portion, of the rear section 105. Since the rear section 105, which is the section most subjected to the tearing, compression and bending forces, is divided into two independent portions 106 and 107, the efforts absorbed by the front portion 106 of the rear section 105 are no longer transmitted, or at least very partially transmitted, to the rear portion 107 of the rear section 105.

Naturally, it also possible to make a two-part fairing 100 in which the distribution of the sections 103, 104 and 105 is different. For example, the first part may comprise the front section 103 and a portion of the central section 104, while a second part comprises the other portion of the central section 104 and the rear section 105. Similarly, the first part 101 may comprise the front section 103 and the central section 104, while the second part 102 comprises the rear section 105 of the fairing 100. In any case, the goal is the same: attenuating the transmission of the forces along the fairing 100.

In one example of an embodiment of the invention, and as shown in FIG. 3, the aircraft provided with the fairing 100 of the invention may be provided with localized fastening devices 108. In any case, the fairing 100 of the invention does not require as many localized fastening devices 108 as the single-block fairing 2 of the prior art. Indeed, since the phenomena of compression and bending of the fairing 100 are eliminated, or at least greatly reduced, by the presence of the two independent parts 101 and 102, the peripheral fastening of the fairing 100 to the lower part of the fuselage of the aircraft holds said fairing 100 to the fuselage. However, it can be planned to improve the link between the fairing 100 and the fuselage by means of localized fastening devices 108 strategically positioned on the fairing 100. In the example shown in FIG. 3, the fairing 100 is provided with four localized fastening devices 108. Two localized fastening devices 108 are positioned at the central section 104 of the fairing 100, and two other localized fastening devices 108 are positioned at the front portion 106 of the rear section 105. Depending on the position at which the fairing 100 is sectioned, a greater or smaller number of fastening devices 108 will be used, and the position of these fastening devices along said fairing 100 will be modified. Each localized fastening device 108 enables the fairing 100 to be held locally on an internal structure (not shown) of the fuselage of the aircraft to which it is fastened.

In one example of an embodiment of the invention, and in order to absorb the tearing, compression and bending forces as efficiently as possible, it is possible to make the fairing 100 so that the second part 102 can be shifted relative to the first part 101, and therefore in such a way that the tearing, compression and bending forces to which the first part 101 is subjected are, to a great extent, absorbed and almost not transmitted to the second part 102. Indeed, in the example described, the second part 102 of the fairing 100 has no localized fastening device 108 between the second part 102 and the fuselage. The second part 102 of the fairing 100 is joined to the fuselage only by means of a peripheral link between the fairing 100 and the fuselage. The second part 102 can thus be at least partially mobile relative to the part 101 which itself is for example provided with four localized fastening devices 108. Naturally, if it is the first part 101 of the fairing 100 that has no localized fastening device 108 and the second part 102 that is provided with it, then it is the first part 101 that can shift relative to the second part 102 which is then fixed.

For example, it can be seen in FIGS. 4a, 4b, 5a, 5b and 5c that a compressible seal 200 can be positioned between the two parts 101 and 102 of the fairing 100.

Figure 4A:
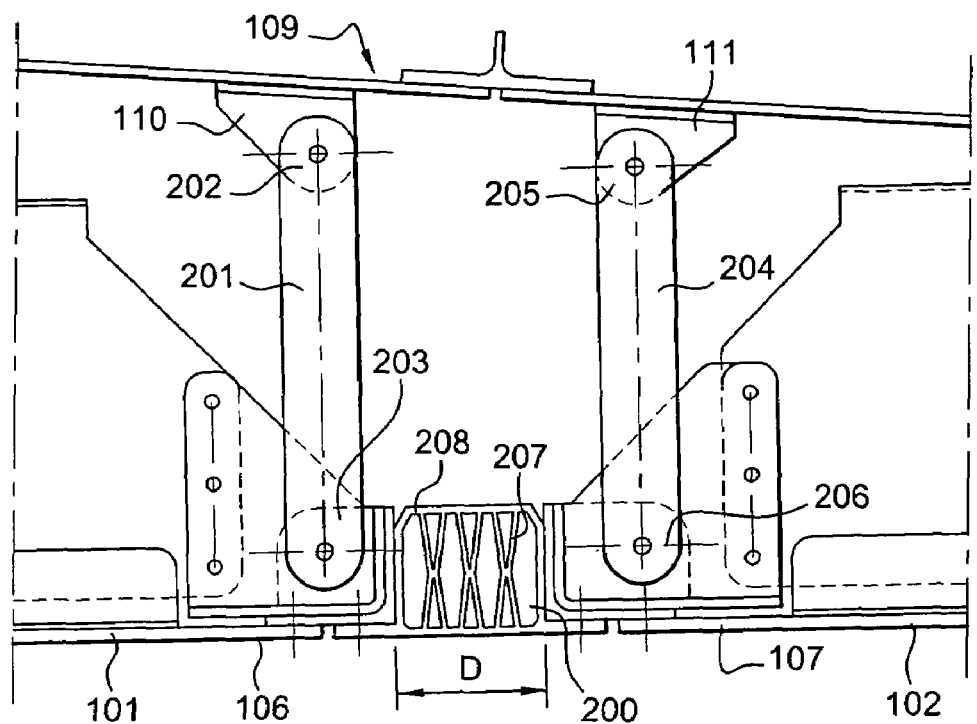
FIGS. 4a and 4b show an exemplary embodiment of a peripheral junction device for the parts of the fairing of the invention.
Figure 4B:
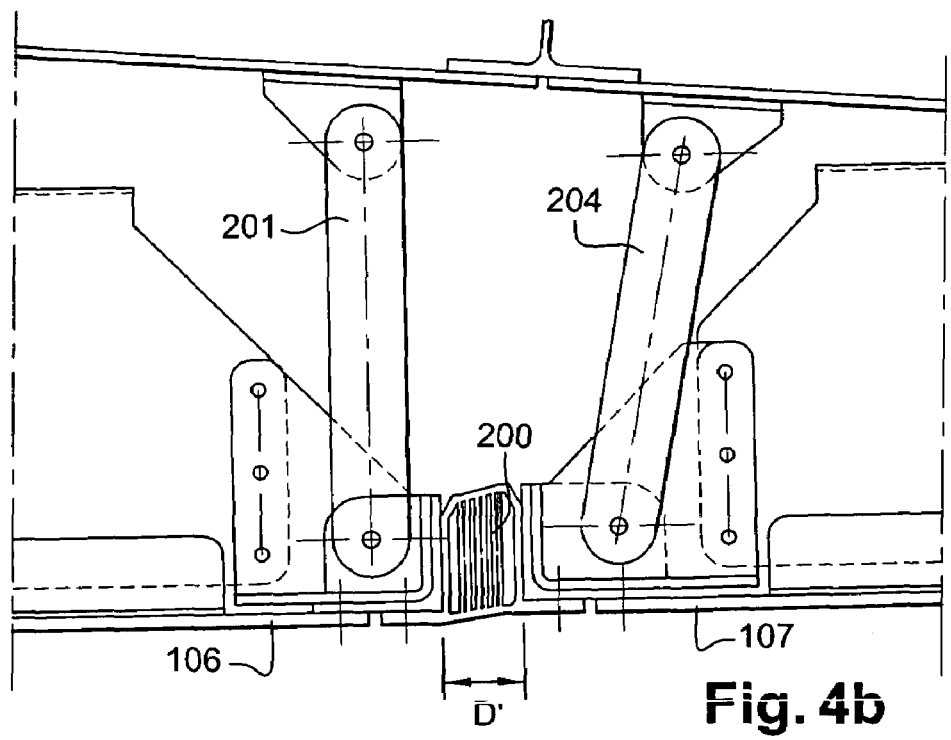

FIGS. 4a and 4b show a first example of an embodiment of such a solution.

In FIG. 4a, the seal 200, place between the first part 101 and the second part 102 of the fairing 100, is in a non-stressed state while, in FIG. 4b, the seal 200 is in a stressed state. The front portion 106 of the rear section 105 is fixedly joined to an internal structure 109 of the fuselage by means of a first vertical tie-rod 201, forming a peripheral junction device. A top end 202, i.e. an end pointed toward the interior of the aircraft, of the first tie-rod 201 is mounted fixed to a connection fitting 110 fixedly joined to the internal structure 109 of the fuselage. A bottom end 203, opposite the top end 202, of the tie-rod 201 is mounted so as to be fixed to the front portion 106 of the rear section 105 of the fairing 100. The rear portion 107 of the rear section 105 is fixedly joined to the internal structure 109 of the fuselage by means of a peripheral junction device formed by a second vertical tie-rod 204. A top end 205 of the tie-rod 204 is mounted rotationally on a connection fitting 111 of the internal structure 109 of the fuselage. A bottom end 206 of the second tie-rod 204 is mounted rotationally on the rear portion 107 of the rear section 105. A distance D between the front portion 106 of the rear section 105 and the rear portion 107 of the section 105 is filled by the presence of the seal 200, in a non-stressed state.

In FIG. 4b, the seal 200 is compressed. The rear portion 107 of the rear section 105 has shifted toward the front portion 106 of said rear section 105. The shifting of the rear portion 107 is permitted by a rotation of the second tie-rod 204. The seal 200 is crushed between the rear portion 107 and the front portion 106 of the rear section 105. For example, the seal 200 is formed by an internal structure 207 made of foam, lined with an external structure 208 made of rubber. Such a composition enables the seal 200 to achieve optimal absorption of the compression and bending forces. Thus, a distance D' between the front portion 106 of the rear section 105 and the rear portion 107 of said section 105 may vary. That is to say, the seal 200 may be compressed to a greater or lesser extent depending on the forces to be absorbed.

Figure 5A:
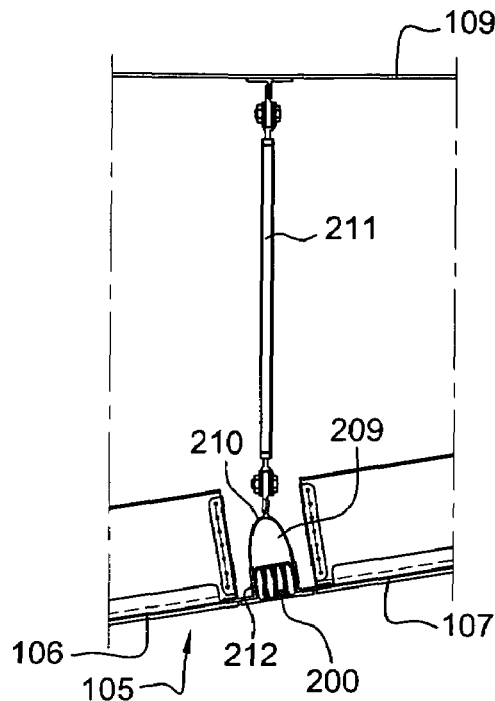
FIGS. 5a to 5c show a second exemplary embodiment of a peripheral junction device for the parts of a fairing of the invention.
Figure 5B:
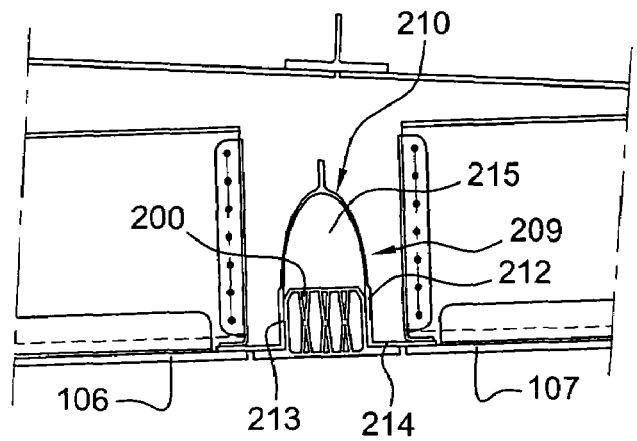
Figure 5C:
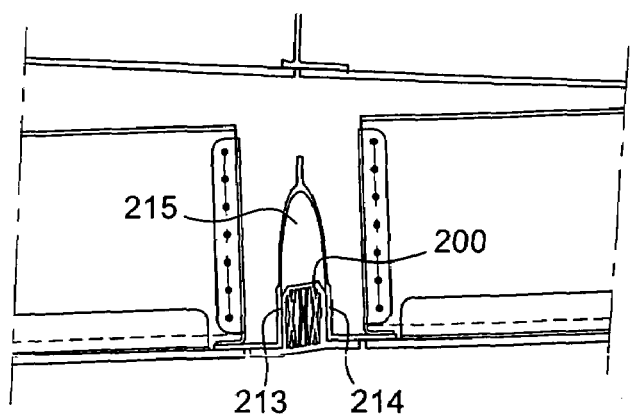

FIGS. 5a to 5c show a second exemplary embodiment of the use of a compressible seal 200 between the two parts 101 and 102 of the fairing 100 of the invention.

FIG. 5a shows an overall view of this second exemplary embodiment. The seal 200 is positioned in a horseshoe-shaped frame 209. A top part 210 of the frame 209 is connected by means of a tie-rod to the internal structure 109 of the fuselage, while a bottom part 212 of said frame 209 is connected to the front portion 106 and rear portion 107 of the rear section 105 of the frame 100.

FIGS. 5b and 5c show a more detailed review of the frame 209, and the seal 200, respectively in a non-stressed state and in a stressed state. The bottom part 212 of the frame 209 comprises two flexible arms 213 and 214, respectively joined fixedly to the front portion 106 and the rear portion 107 of the rear section 105. When the rear portion 107 of the rear section 105 tends to approach the front portion 106 of said section 105, the arms 213 and 214 approach each other, compressing the seal 200 housed in the space 215 made between the two arms 213 and 214.

Figure 6:
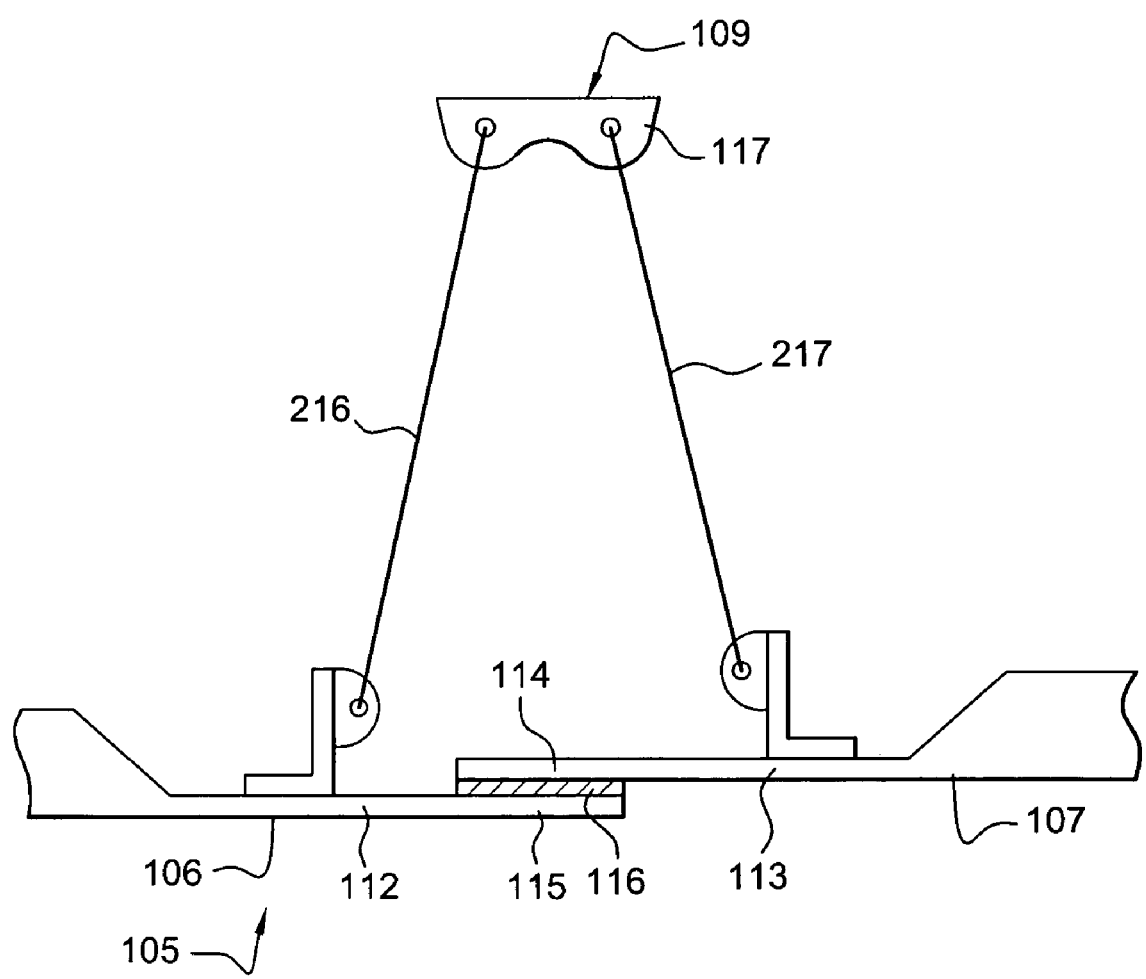
FIG. 6 shows a third exemplary embodiment of a peripheral junction device for the parts of the fairing of the invention.
Figure 7:
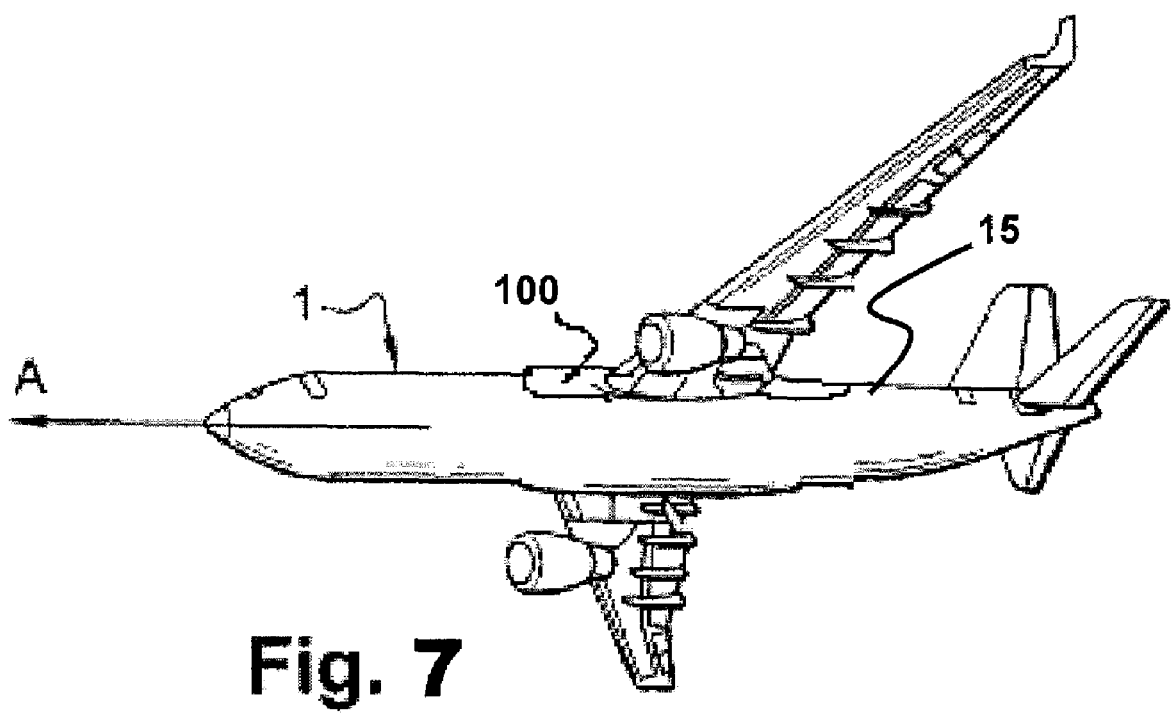
FIG. 7 is a perspective view of an aircraft fairing according to an embodiment of the invention.

FIG. 6 shows another exemplary embodiment of a link between the first part 101 and the second part 102 of the fairing 100. The front portion 106 of the rear section 105 is provided with a panel 112. The rear portion 107 of the rear section 105 is provided with a panel 113. A periphery of each panel 112 and 113 is fixedly joined, by means of a tie-rod 216 and 217, to the internal structure 109 of the fuselage. For example, the internal structure 109 is provided with a double connection fitting 117, on which the two tie-rods 216 and 217 are mounted. The link between the internal structure 109 and the panel 112 and 113 is such that at least the panel 113 can shift laterally relative to the panel 112.

In the example shown in FIG. 6, the panel 113 partly overlaps the panel 112, i.e. a part 114 of the panel 113 is located inside the fuselage, on top of a part 115 of the panel 112 that it overlaps. In another exemplary embodiment of the invention, it is possible to mount the panel 112 and 113 in such a way that the panel 112 overlaps the panel 113. Thus the panels 112 and 113 slide relative to each other so that the front portion 106 and rear portion 107 of the rear section 105 can be made to approach each other and/or move away from each other, in order to absorb the compression and bending forces to which the fairing is subjected.

In order to facilitate a sliding of the panel 113 on the panel 112, it is possible, as shown in FIG. 6, to place a layer 116 of a material with a low coefficient of friction between the two panels 112 and 113. For example, between the part 114 of the panel 113 and the part 115 of the panel 112, a layer 116 of plastic material such as Teflon is placed.

In any case, it is planned to also fixedly join each part 101 and 102 of the fairing 100 with the fuselage 4 by means of a classic peripheral link, in order to close the lower part 3 of the fuselage 4.

According to an arrangement of the wing structure 5 on the fuselage 4, the fairing 100 may be fixedly joined with a different part of said fuselage 4. For example, when the aircraft 1 is provided with a low wing structure 5 as shown in figure 1, the fairing 100 is fixedly joined with the lower part 3 of the fuselage. In the ease of an aircraft 1 with a high wing structure, on the contrary, the fairing 100 being located on the wing structure, it is fixedly joined to an upper part 15 of the fuselage.

What is claimed is:

1. An aircraft comprising:
   a fuselage,
   a wing structure including at least two wings extending on either side of the fuselage,
   a fairing, a periphery of said fairing being fixedly joined to said fuselage,
   wherein the fairing comprises a first part and a second part, wherein the first part and the second part are two structurally independent parts, and wherein the second part of the fairing is shiftable relative to the first part of the fairing along a longitudinal axis of the aircraft.

2. The aircraft according to claim 1, wherein the first part of the fairing comprises a front section, a central section and a first portion of a rear section, the second part of the fairing comprising a second portion of the rear section.

3. The aircraft according to claim 2, further comprising two panels respectively joined fixedly to the first portion of the rear section of the fairing and joined fixedly to the second portion of the rear section of the fairing, the panels at least partially overlapping one another and being capable of sliding relative to one another.

4. The aircraft according to claim 3, further comprising an intermediate layer positioned between the two panels, the layer being capable of reducing friction between the two panels.

5. The aircraft according to claim 4, wherein the intermediate layer is a plastic material with a low coefficient of friction.

6. The aircraft according to claim 1, wherein the first part of the fairing is provided with four devices for the localized fastening of said first part to internal structures of the fuselage.

7. The aircraft according to claim 1, further comprising a compressible seal positioned between the first part and the second part of the fairing.

8. The aircraft according to claim 1, further comprising at least one peripheral junction device capable of connecting a periphery of the two parts of the fairing to the fuselage.

9. The aircraft according to claim 1, wherein the fairing is fixedly joined to a lower part of the fuselage.

10. The aircraft according to claim 1, wherein the fairing is fixedly joined to an upper part of the fuselage.

* * * * *

UNITED STATES PATENT AND TRADEMARK OFFICE
CERTIFICATE OF CORRECTION

PATENT NO. : 7,407,135 B2
APPLICATION NO. : 11/147861
DATED : August 5, 2008
INVENTOR(S) : Rouyre Page 1 of 1

It is certified that error appears in the above-identified patent and that said Letters Patent is hereby corrected as shown below:

Column 3:

Line 9:
After "fairing;" begin a new paragraph.

Line 17:
After "invention;" delete "and".

Line 20:
After "invention" delete "." and insert --; and--.

Column 4, Line 55:
Delete "place" and insert --placed--.

Column 5, Line 61:
Delete "panel" and insert --panels--.

Signed and Sealed this

Fifteenth Day of September, 2009

David J. Kappos
*Director of the United States Patent and Trademark Office*